Nov. 30, 1948.   F. W. SLACK ET AL   2,455,343
JOINT
Filed April 11, 1945   2 Sheets-Sheet 1
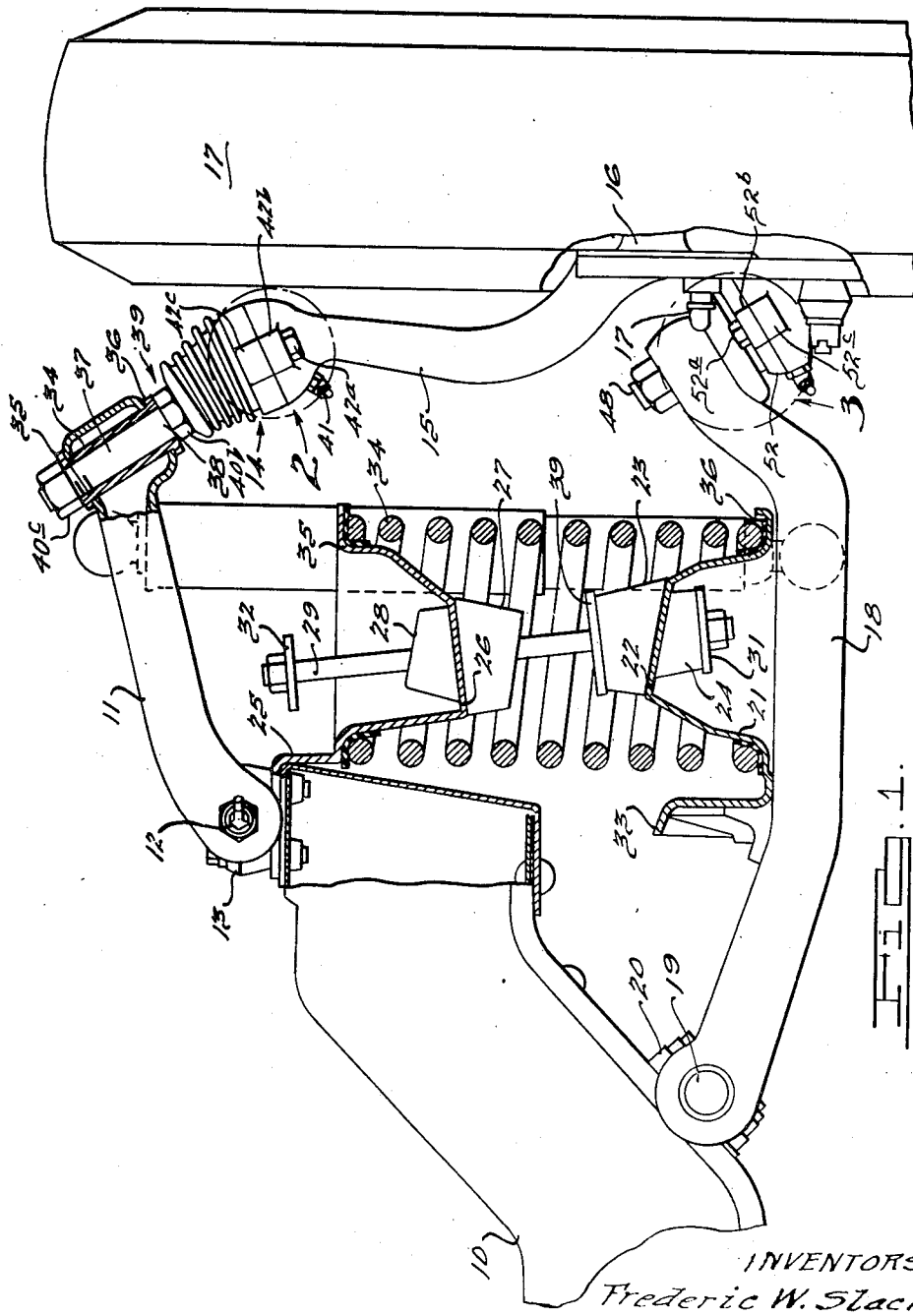
INVENTORS.
Frederic W. Slack,
Chester C. Utz.
BY
Harness and Harris
ATTORNEYS.

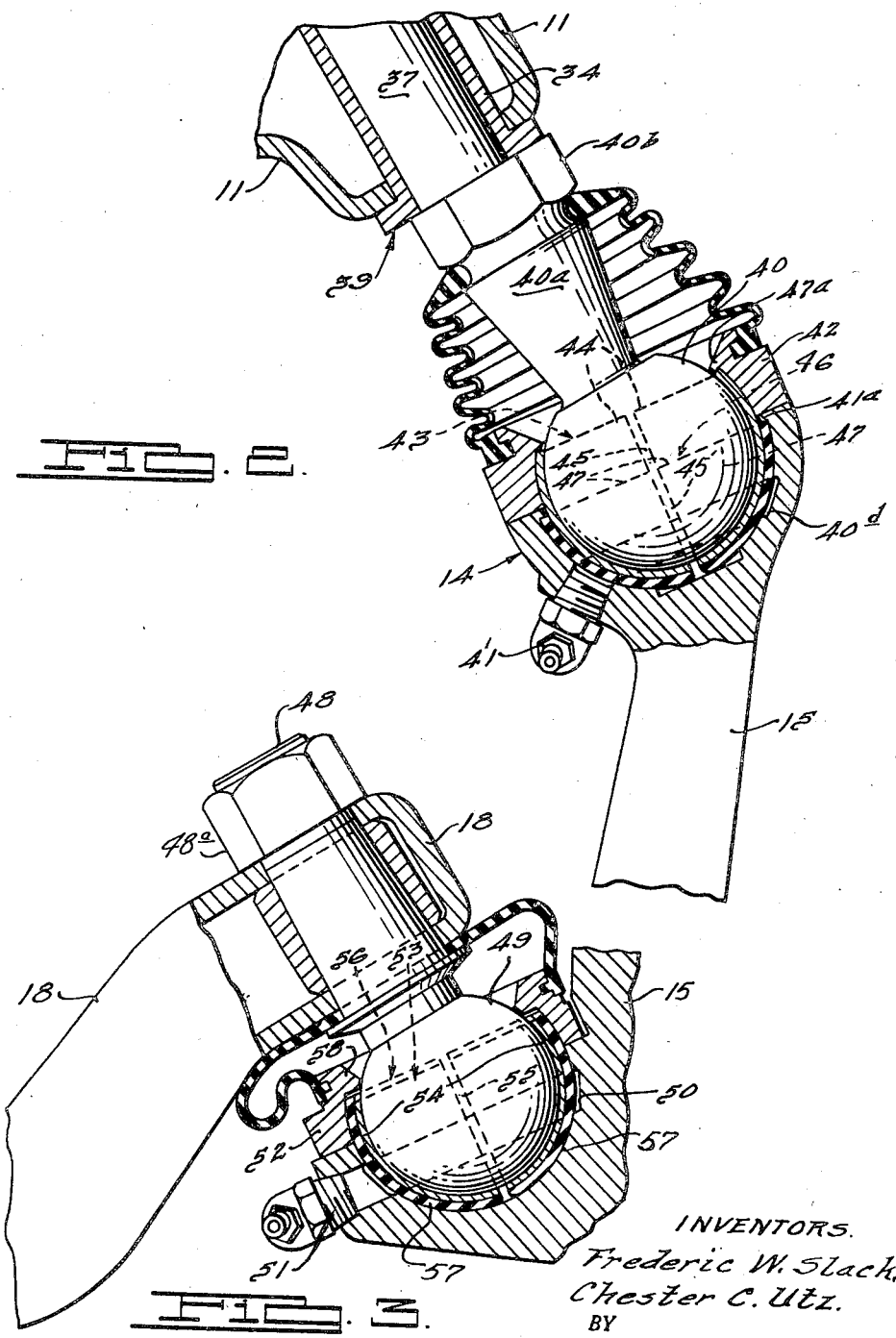

UNITED STATES PATENT OFFICE 2,455,343

JOINT

Frederic W. Slack, Detroit, and Chester C. Utz, Magnolia, Mich., assignors to Chrysler Corporation, Highland Park, Mich., a corporation of Delaware Application April 11, 1945, Serial No. 587,746

6 Claims. (Cl. 287—87)

This invention relates to a universal joint construction. More specifically it relates to an arrangement of parts for improving the fit between a ball and a socket of a universal joint.

It is desirable to have in a universal joint between the ball and the socket a fit comparable to the running fit of a shaft so that too much play and undesirable pounding is eliminated. On the other hand, the fit between the ball and the socket should not be so close that the resulting high friction will present a too high resistance to relative turning of the parts. In many instances shims have been required for a proper fit. In some constructions a bearing shell has been drawn around, relative sliding taking place between the ball and the shell, but it has been difficult to obtain a proper fit of the bearing shell in the structure in which it is mounted and at the same time to have a good fit between the ball and the bearing shell. In some cases the bearing shell has been too thin in spots.

An object of the present invention is to obtain an improved universal joint construction and more particularly, one in which an improved fit is had between the ball and the surrounding part.

Another object is to provide improvements in a universal joint construction in which the bearing shell in which the ball of the universal joint has a sliding fit is resiliently backed.

A further object is to provide a universal joint as to which a satisfactory running fit between the ball of the joint and the surrounding member may be obtained without the use of shims.

Still another object is to provide improvements in the scheme for lubricating a universal joint. Such improvements may be employed in a universal joint in which a bearing shell surrounding the ball of the joint has a resilient backing of a substance such as rubber.

Other objects will appear from the disclosure.

In the drawing:

Fig. 1 is a fragmentary view partially in section of a vehicle frame and a steerable front wheel connected to a portion thereof;

Fig. 2 is a detail view partially in section of the portion of the structure of Fig. 1 contained in the circle 2 in Fig. 1; and Fig. 3 is a detail view partially in section of the structure of Fig. 3 contained in circle 3 of Fig. 1.

Reference character 10 designates a vehicle frame to which is pivotally connected one end of an upper link 11 as indicated at 12 by means of a bracket structure 13. That one end of the link 11 may be bifurcated so that it will extend on opposite sides of the bracket structure 13.

The other end of the link 11 is connected by universal joint structure 14 to the upper end of a part 15 having a spindle 16 upon which is rotatably mounted a steerable ground wheel 17. The lower end of the part 15 is connected by universal joint 17 to one end of a lower link 18. The other end of the link 18 is pivotally connected as indicated at 19 to the vehicle frame 10 by means of a bracket structure 20. The said other end of the lower link 18 may be bifurcated so as to extend on opposite sides of the bracket structure 20. A member 21 secured to the lower link 18 is cup-shaped and has a central portion 22 forming the base of the cup, to opposite sides of which are bonded resilient bumpers 23 and 24, which may be formed conveniently of a material such as rubber. A member 25 secured to the vehicle frame 10 is cup-shaped and has a central portion 26 forming the base of the cup to which are bonded resilient bumpers 27 and 28. The bumpers 23 and 27 are relatively thin on the side toward the pivot 19 of the lower link 18 and relatively thick on the other side. Conversely the bumpers 28 and 24 are relatively thick on the side toward the pivot 19 and are relatively thin on the other side. The rod 29 extends through openings in the central portions 22 and 26 and through the bumpers 23, 24, 27, and 28. Stops 39 and 31 on the rod 29 engage respectively the bumpers 23 and 24 so as to prevent relative axial movement between the rod 29 and the member 21 except for that permitted by deformation of the bumpers 23 and 24. Upon upward movement of the links 11 and 18, the stop 39 engages the bumper 27. Upon downward movement of the links, a stop 32 fixed to the upper end of the rod 29 engages the bumper 28. The member 21 has an upstanding portion 33 engageable with the under side of the vehicle frame 10 so as to limit upward movement of the links 11 and 18. A coil spring 34, serving to urge the lower link 18 downwardly is seated at its upper end on a portion 35 of the member 25 outward of and displaced from the central portion 26 and at its lower end on a portion 36 of the member 21 outward of and displaced from the central portion 22. The bumpers 23, 24, 27, and 28, the rod 29, and the stops 39, 31, and 32 are claimed and more fully described in the copending application Slack and Utz, Serial No. 578,665, filed February 19, 1945, now Patent 2,414,674.

The upper link 11 has an opening in which is secured the bushing 34 having flanges 35 and 36 at the ends abutting the nuts 40ᵇ and 40ᶜ. Positioned within the bushing 34 is a circular portion 37 of a shank 38 of a member 39, which also has a ball or spherical portion 40. The shank 38 also includes a tapering portion 40ᵃ and a polygonal portion 40ᵇ, adapted to be gripped by a tool such as a wrench. A nut 40ᶜ on the end of the shank 38 secures the member 39 against movement. The center of the ball portion 40 is displaced from the axis of the circular portion 37 of the shank 38 so that angular adjustment of the member 39 about the axis of the circular portion 37 produces a shifting of the ball portion 40, resulting in transverse and/or longitudinal movement of the upper end of the wheel-carrying part 15. Thus camber or caster of the wheel 17 is adjusted. As shown in Fig. 2, the upper end of the wheel-carrying part 15 is provided with a generally hemispherical recess in which is formed a lubricating groove 40ᵈ extending about the hemispherical recess. A lubricant fitting 41 is attached to the upper end of the part 15 in communication with the groove 40ᵈ. An upper end of the wheel-carrying part 15 is provided with an inwardly extending flange 41ᵃ at the hemispherical recess in the end of the part 15. A cap 42 is secured to the upper end of the wheel-carrying part 15 by cap screws 42ᵃ, one being shown, extending through bosses 42ᵇ on part 15 and engaging bosses 42ᶜ on cap 42. The cap 42 has an opening, a portion of which is spherically formed and registers with the flange 41ᵃ formed at the recess in the part 15. The ball portion 40 of the member 39 is surrounded by a closely fitting bearing shell 43 formed in mating halves 44, which have a slight space 45 between them. A rubber shell 46 of approximately hemispherical formation fits about a portion of the metallic bearing shell 43. Shell 46 is formed in mating halves 47, which have between them a slight space as indicated at 45'. It has been stated that the shell 46 is formed of rubber but this is for purpose of illustration only, for it may be formed of any suitable resilient material. The parts of the rubber shell 46 may be cemented, bonded, or molded to the parts of the metallic bearing shell 43. The rubber shell 46 is of a size enabling it to fit entirely in the recess in the wheel-carrying part 15 in engagement with the under side of the flange 41ᵃ formed at the recess. The metallic bearing shell 43 extends out of the rubber shell 46 and into the recess in the cap 42 into engagement with a flange 47ᵃ, formed in the opening in the cap 42. The flange 47ᵃ prevents sliding movement of the shell 43 in the cap 42 and the upper end of the part 15 in the same way the flange 41 prevents similar movement of the rubber shell 46, although the bond between the rubber shell 46 and the metallic shell 43 would do the same thing. The space 45 between the parts of the shells crosses the lubricant groove 40ᵈ in two places and thus serves to conduct lubricant from the groove 40ᵈ to between the bearing shell 43 and the ball portion 40. Relative sliding movement takes place between the ball portion 40 and the bearing shell 43. It will be observed that no shims are provided between the cap 42 and the upper end of the wheel-carrying part 15. It has been possible to eliminate these shims because of the flexibility provided by the rubber shell 46. Because the rubber shell 46 is employed, it is not necessary that the metallic bearing shell 43 be perfectly shaped with respect to the recess in the upper end of the wheel-carrying part 15. If the rubber shell were eliminated the metallic bearing shell 43 would fit directly in the recess in the part 15 and the fit would have to be perfect or otherwise the pressure between the bearing shell 43 and ball portion 40 would not be uniform throughout the area of contact. If, on the other hand, with no rubber shell 46 the fit of the metallic bearing shell 43 in the recess in the part 15 is not good, the fit between the bearing shell 43 and the ball portion 40 may not be satisfactory.

Fig. 3 shows in detail the universal joint 17 between the lower end of the wheel-carrying part 15 and the outer end of the lower link 18. The shank of a member 48 extends through and is secured to the outer end of the link 18 by means of a nut 48ᵃ. The member 48 has a spherical or ball portion 49. The lower end of the wheel-carrying part 15 has a generally hemispherical recess around which runs a lubricant groove 50. A lubricant fitting 51 is mounted in the lower end of the wheel-carrying part 15 and communicates with lubricant groove 50. A cap 52 is secured to the lower end of the part 15 at the recess therein by cap screws 52ᵃ, one being shown, extending through bosses 52ᵇ on cap 52 and engaging bosses 52ᶜ on part 15. Cap 52 has an opening, a portion of which is spherically formed. Ball portion 49 is surrounded in a close fit by a metallic bearing shell 53 formed of mating halves 54 having a space 55 between them. The metallic bearing shell 53 is surrounded by a rubber shell 56, which may be bonded, cemented, or molded to the shell 53. The rubber shell 56 is formed of mating halves 57 having a space between them, the same space 55. The shell 56 is stated to be formed of rubber but this is for the purpose of illustration only, for it may be formed of any suitable resilient material. The space 55 between the parts of the shells intersects the lubricant groove 50 at two points and thus serves to conduct lubricant from the groove 50 to between the metallic shell 56 and the ball portion 49. The rubber shell 56 of Fig. 3 differs from the rubber shell 46 of Fig. 2 in that it includes more than a hemisphere and is not entirely in the part 15 but extends out into the opening in the cap 52 into engagement with an inwardly directed flange 58 formed in the opening in the cap 52. The reason for the greater extent of the rubber shell 56 forming part of the lower universal joint 17, is that this lower joint is subjected to greater loading and more varying directions of loading. The ball portion 49 of the lower universal joint 17 has insulation due to the rubber shell 56 both in a downward direction and in an upward direction. The rubber shell 46 of the upper universal joint 14 provides the ball portion 40 with insulation only in the downward direction but it has been found that only this extent of insulation is required. The flange 58 prevents sliding about of the shells 53 and 56 with respect to the cap 52 and the lower end of wheel-carrying part 15.

We claim:

1. A universal joint comprising a first member having a ball portion, a second member having a socket and a lubricant groove extending about the socket, a lubricant fitting mounted in the second member in communication with the lubricant groove, a rubber shell formed of mating parts and mounted in the socket, and a metal bearing shell formed of mating parts and mounted in the rubber shell and receiving the ball portion of the first member for relative sliding movement, the mating parts of the rubber shell being arranged with a slight space between one another, the mating parts of the metal bearing shell being arranged with a slight space between one another, the aforesaid spaces being in registration with one another and intersecting the lubricant groove in the socket for providing access of lubricant from the groove to between the metal bearing shell and the ball portion of the first member.

2. A universal joint comprising a first member having a ball portion and a shank portion, a second member having a recess, a cap having a recess combining with the recess of the second member to form a socket for the ball portion of the first member, the cap and second member meeting in a plane extending at a substantial angle to the direction of the length of the shank portion of the first member, a rubber shell mounted within the socket entirely within the second member, and a metal bearing shell mounted within the rubber shell and extending out of the rubber shell into the recess in the cap and surrounding the ball portion of the first member for sliding contact therewith.

3. A universal joint comprising a first member having a ball portion and a shank portion, a second member having a recess, a cap having a recess combining with the recess of the second member to form a socket for the ball portion of the first member, the cap and second member meeting in a plane extending at a substantial angle to the direction of the length of the shank portion of the first member, a rubber shell mounted within the socket and extending into the second member and the cap, and a metal bearing mounted within the rubber shell and extending in the second member and the cap and surrounding the ball portion of the first member for sliding contact therewith.

4. A universal joint comprising a first member having a spherical portion and a shank portion, a second member having a hemi-spherical recess formed therein and an inwardly extending flange at the end thereof, a cap having an opening and spherically formed portion of a diameter corresponding to the flange at the recess in the second member, the spherical portion of the first member being positioned in the recess in the second member and in the opening in the cap, the cap and the second member meeting generally in a plane extending at a substantial angle to the shank portion of the first member, a hemi-spherical rubber shell positioned in the recess in the second member with its edge engaging the under side of the flange, and a metal bearing shell positioned in the rubber shell and extending out of the rubber shell in the spherically formed portion of the opening in the cap and surrounding the spherical portion of the first member for sliding contact therewith.

5. A universal joint comprising a first member having a ball portion and a shank portion, a second member having a recess and a lubricating groove extending about the recess, a cap having a recess combining with the recess of the second member to form a socket for the ball portion of the first member, the cap and the second member meeting at a substantial angle to the direction of the length of the shank portion of the first member, a rubber shell formed of mating parts and mounted in the socket, and a metal bearing shell formed of mating parts and mounted in the rubber shell and receiving the ball portion of the first member for relative sliding movement, the mating parts of the rubber shell being arranged with a slight space therebetween, the mating parts of the metal bearing shell being arranged with a slight space therebetween, the aforesaid spaces being in registration with one another and intersecting the lubricant groove in the socket for providing access of lubricant from the groove to between the metal bearing shell and the ball portion of the first member.

6. A universal joint comprising a first member having a ball portion and a shank portion, a second member having a recess and a lubricating groove extending about the recess, a cap having a recess combining with the recess of the second member to form a socket for the ball portion of the first member, the cap and the second member meeting at a substantial angle to the direction of the length of the shank portion of the first member, a rubber shell formed of mating parts and mounted in the socket entirely within the second member, and a metal bearing shell formed of mating parts and mounted in the rubber shell and extending out of the rubber shell into the recess in the cap and receiving the ball portion of the first member for relative sliding movement, the mating parts of the rubber shell being arranged with a slight space therebetween, the mating parts of the metal bearing shell being arranged with a slight space therebetween, the aforesaid spaces being in registration with one another and intersecting the lubricant groove in the socket for providing access of lubricant from the groove to between the metal bearing shell and the ball portion of the first member.

FREDERIC W. SLACK.
CHESTER C. UTZ.

REFERENCES CITED

The following references are of record in the file of this patent:

UNITED STATES PATENTS

| Number | Name | Date |
|---|---|---|
| 485,471 | Morrison | Nov. 1, 1892 |
| 1,759,430 | Benjamin | May 20, 1930 |
| 1,923,414 | Benjamin | Aug. 22, 1933 |
| 2,096,557 | Peo | Oct. 19, 1937 |
| 2,281,097 | Flumerfelt | Apr. 28, 1942 |
| 2,305,880 | Leighton | Dec. 22, 1942 |